Oct. 8, 1968   E. W. KIELSMEIER   3,404,715
COMMINUTOR HAVING FLUID BIASED BLADES
Filed May 9, 1966
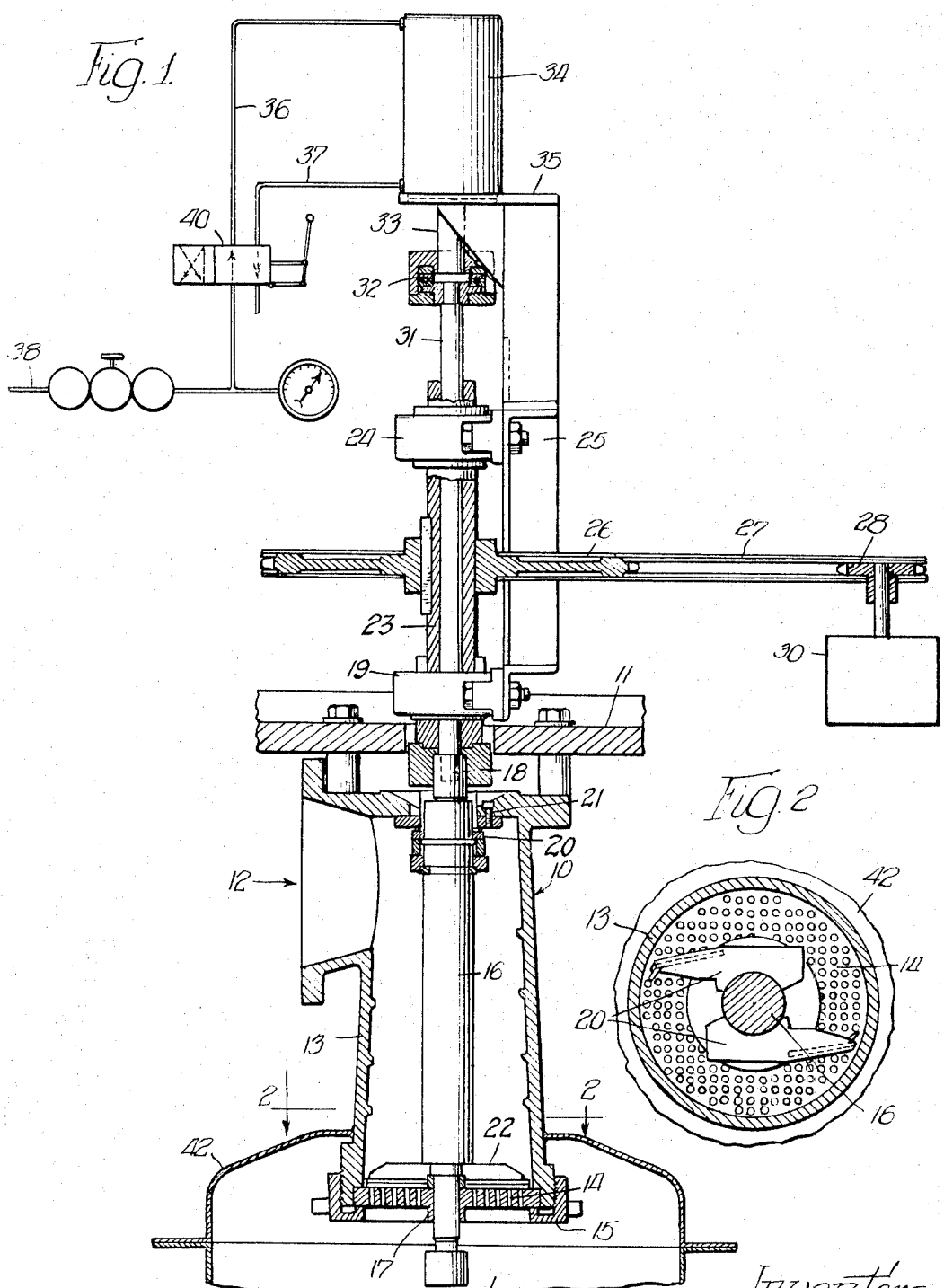

United States Patent Office 3,404,715
Patented Oct. 8, 1968

3,404,715
COMMINUTOR HAVING FLUID BIASED BLADES
Elwood W. Kielsmeier and Frederic H. Middleton, Madison, Wis., assignors to Oscar Mayer & Co., Inc., Chicago, Ill., a corporation of Illinois
Filed May 9, 1966, Ser. No. 548,685
6 Claims. (Cl. 146—192)

ABSTRACT OF THE DISCLOSURE

A comminuting machine for grinding various products, such as meats, and the like, which is characterized by a vertically disposed housing inclosing cutting blades mounted on the end of a vertical shaft which is rotated so as to engage the cutting edge of the blades with the inner surface of a perforated cutting plate in the bottom of the housing, with a means for applying an axial thrust to the blade carrying shaft by a fluid operated piston and a thrust rod extending through a hollow drive shaft and with a control in the fluid line to the piston which is operable to vary the axial thrust applied.

---

This invention relates to machines for reducing the particle size of products and is particularly concerned with improvements in a machine of the type which is adapted for grinding or cutting comestible products such as meat and the like.

Machines have heretofore been developed for use in cutting or grinding many materials including agricultural and animal products, for example, meat for preparing sausage products and the like. One form of machine which has heretofore been used for reducing to a finely divided state sausage meats and similar products comprises a plurality of cutting blades mounted in radial holders on a shaft which rotates within a housing in which there is mounted a cutting plate which is perforated for passage of the product cut by the blades working against the inner surface of the plate. In some machines of this type, a spring has been relied upon to hold the blades in engagement with the cutting plate. While this type of machine has been employed in preparing such materials as sausage batters, it has not been entirely satisfactory for several reasons, one of which is the inability to control or adjust the pressure exerted by the blades against the cutting plate. It is a general object, therefore, of the present invention to provide in a grinding or comminuting machine an improved arrangement for supporting the blades with provisions for loading the blades so as to enable the pressure exerted by the blades against the inner face of the cutting plate to be adjusted and controlled.

It is still a further object of the invention to provide a machine for grinding or comminuting products wherein the cutting blades are mounted on a driven shaft in a cylindrical product receiving chamber with the blades engaging the inner face of a perforated cutting plate and in which provision is made for controlled application of pressure along the axis of the blade mounting shaft so as to hold the blades in contact with the grinding plate.

It is another object of the invention to provide a grinding machine of the type described wherein the cutting blades or knives are mounted on a driven shaft and provision is made for applying an axial load on the shaft so as to prevent lifting of the knives from the grinding plate and to maintain the desired pressure of the knives against the grinding plate with full pressure control externally of the machine assembly where it is readily accessible for adjustment without interrupting the operation of the machine.

It is still a further object of the invxention to provide a grinding or comminuting machine wherein cutting blades or knives are mounted on the end of a shaft which is rotated so as to engage the cutting edge of the blades with the inner surface of a perforated cutting plate and wherein an axial thrust is applied to the shaft by a fluid operated piston through a thrust bearing connection so as to hold the knives in contact with the grinding plate and insure uniform grinding operation.

These and other objects and advantages of the invention will become apparent from a consideration of the grinding machine which is shown by way of illustration in the accompanying drawings wherein:

FIGURE 1 is a view partially in elevation and partially in section illustrating a product grinding machine which embodies the principles of the invention; and FIGURE 2 is a cross section taken on the line 2—2 of FIGURE 1, to an enlarged scale.

Referring to the drawings, there is illustrated a machine which is especially useful for grinding various products such as comestibles, particularly agricultural and animal products, and including meats suitable for sausage products, hamburger and the like. The machine comprises a cylindrical housing 10 which is bolted or otherwise secured in a vertically disposed position on a fixed support 11. A product input or feed opening 12 is provided near the top of the housing 10 in the side wall 13. A perforated cutting plate 14 is mounted at the bottom end of the housing by means of a clamp or cap ring 15 having a screw thread connection with the lower end of the housing 10.

A knife supporting shaft 16 is disposed vertically within the housing 10, with the axis thereof coinciding with the axis of the housing 10, and with the lower end thereof seated in a guide bearing 17 in the center of the cutting plate 14. The upper end of the shaft 16 is contained by a square coupling 18 supported by a bearing 19 and sealed by a seal assembly 20 in an aperture 21 at the top of the housing 10. A plurality of radially extending knife assemblies 22 are carried on the lower end of the shaft 16 with the cutting blades thereof positioned for engagement with the upper face of the cutting plate 14.

The knife shaft 16 has a driving connection with a hollow drive shaft 23 which is journaled in bearings 19 and 24 supported in vertically spaced relation on an upstanding bracket member 25 fixed above the supporting frame 11. The drive shaft 23 carries a drive sprocket 26 which is connected by chain 27 with a drive sprocket 28 mounted on the power output shaft of a laterally positioned variable speed drive unit 30. The hollow drive shaft 23 accommodates a thrust shaft 31 which depends from a thrust bearing 32 carried on the end of the piston rod 33 which extends from a fluid pressure cylinder 34 mounted on a horizontal bracket 35 at the top of the vertical bracket 25. The thrust shaft extends through the hollow drive shaft 23, with radial clearance between the two shafts, to the upper end of shaft 16 and transmits axial pressure to the shaft 16. The fluid cylinder 34 which functions as a pressure applying device may be an air cylinder. It has a suitable connection through the lines 36 and 37 with a fluid supply line 38. A manually operated control valve 40 is connected in the air supply line with suitable pressure regulating and indicating equipment. The valve 40 may be operated manually or by automatic means (not shown) to control the supply and exhaust air lines 36 and 37 for the air cylinder 34 so as to control the application of pressure by the piston rod 33 through the thrust bearing 32, thrust shaft 31 and knife shaft 16 to the cutting knives 22 adjacent the bottom end of the shaft 16. The product which passes through the cutting plate 14 is discharged into a product receiving chamber or compartment 41 formed below the bottom end of the housing 10 by a casing 42 attached thereto, or the product may be otherwise collected and removed from the machine.

In operating the machine the meat or other product is fed through the side wall opening 12 into the housing 10 and ground by the knives 22 operating against the top face of the perforated grinding plate 14 for discharge through the latter into the collecting area 41. The pressure exerted by the knives 22 against the cutting plate 14 is adjusted and controlled through operation of the valve 40 and the air cylinder 34. With this arrangement sufficient axial pressure may be applied through the shafts to maintain the knives in contact with the grinding plate at all times and to prevent lifting of the knives from the plate so as to obtain maximum grinding action. In addition, the blades are rendered self-sharpening through pressure engagement with the face of the cutting plate 14.

The invention is illustrated in a machine of the type which is designed for slow speed grinding. However, it is not limited to slow speed operations but is equally applicable to other grinding apparatus including comminuting machines which generally operate at relatively high speeds.

While particular materials and specific details of construction have been referred to in describing the form of the apparatus illustrated, it will be understood that other materials and equivalent structural details may be resorted to within the spirit of the invention.

We claim:

1. A machine for grinding meat or similar products comprising an upright housing having mounted therein a perforated cutting plate which separates a product receiving chamber and a product discharge chamber, a shaft rotatably mounted in said product receiving chamber, one or more cutting knives mounted in radially disposed relation on said shaft and positioned for co-operation with said cutting plate, said knife bearing shaft being mounted so that it is free to move in an axial direction, a hollow drive shaft connecting with the shaft in the receiving chamber for driving the same, and fluid pressure operated means extending through said hollow drive shaft and engaging with said knife bearing shaft for applying thereto an axial load so as to hold the cutting knife against the cutting plate while it is rotated by operation of said drive shaft.

2. A machine as recited in claim 1, and said fluid pressure operated means comprising a fluid cylinder having a piston in axially aligned relation with said knife bearing shaft, a rod member forming a load transmitting means therebetween, and means for supplying a fluid under pressure to said cylinder.

3. A machine as recited in claim 2, and said fluid supply means including a control means so as to vary the axial pressure applied to said knife bearing shaft.

4. A machine for grinding meat or similar products comprising an upright housing having mounted in the lower end thereof a perforated cutting plate through which the product is discharged into a collecting receptacle, a rotatably mounted, axially movable knife shafe in the housing, a hollow drive shaft journaled in spaced bearings and having a driving connection with the knife shaft in the housing, a fluid cylinder mounted in line with the knife shaft and a bar member forming a non-rotatable pressure transmitting connection between the piston of said fluid cylinder and said knife shaft, means supplying said cylinder with fluid under pressure so as to deliver axial pressure through said bar member to the knife shaft, and a plurality of cutting knives mounted on the lower end of the knife shaft for cutting engagement with the face of the cutting plate.

5. A machine as recited in claim 4, and means for controlling the fluid supplied to said cylinder so as to vary the pressure delivered through the shafts to the cutting knives for holding the knives in cutting engagement with the cutting plate.

6. A machine for grinding meat or similar products comprising an upright housing having mounted in the lower end thereof a perforated cutting plate through which the product is discharged into a collecting receptacle, a rotatably mounted, axially movable knife shaft in the housing, a hollow drive shaft journaled in spaced bearings and having a driving connection with the knife shaft in the housing, a fluid cylinder mounted with its piston in axial alignment with the knife shaft and force transmitting means between the same, means supplying said cylinder with fluid under pressure so as to apply pressure to the knife shaft, a plurality of cutting knives mounted on the lower end of the knife shaft, means for controlling the fluid supplied to said cylinder so as to vary the pressure delivered through the shafts to the cutting knives for holding the knives in cutting engagement with the cutting plate, and said force transmitting means comprising a shaft extending in non-rotatable relation through said drive shaft into pressure engagement with said knife shaft.

References Cited
UNITED STATES PATENTS

| | | | |
|---|---|---|---|
| 2,101,442 | 12/1937 | Martinez | 241—231 X |
| 2,646,728 | 7/1953 | Coghill et al. | 241—259 X |
| 2,823,871 | 2/1958 | Larsson | 241—259 X |
| 2,840,318 | 6/1958 | Schnell | 146—192 X |
| 3,076,487 | 2/1963 | Illsley | 146—182 |

W. GRAYDON ABERCROMBIE, *Primary Examiner.*